(12) United States Patent
Nelson (10) Patent No.: US 8,264,320 B2
(45) Date of Patent: Sep. 11, 2012

(54) AFTERMARKET KEYLESS STARTER

(75) Inventor: Robert A. Nelson, Hampstead (CA)

(73) Assignee: Automobility Distribution Inc., Ville Saint-Laurent, Quebec (CA)

( * ) Notice: Subject to any disclaimer, the term of this patent is extended or adjusted under 35 U.S.C. 154(b) by 1266 days.

(21) Appl. No.: 11/860,227

(22) Filed: Sep. 24, 2007

(65) Prior Publication Data

US 2008/0074234 A1    Mar. 27, 2008

Related U.S. Application Data

(60) Provisional application No. 60/846,356, filed on Sep. 22, 2006.

(51) Int. Cl.
| G05B 19/00 | (2006.01) |
| G05B 23/00 | (2006.01) |
| G06F 7/00  | (2006.01) |
| G06F 7/04  | (2006.01) |
| G08B 29/00 | (2006.01) |
| G08C 19/00 | (2006.01) |
| H04B 1/00  | (2006.01) |
| H04B 3/00  | (2006.01) |
| H04L 9/14  | (2006.01) |
| H04L 9/32  | (2006.01) |
| H04Q 9/00  | (2006.01) |
| B60R 25/00 | (2006.01) |

(52) U.S. Cl. .......................................... 340/5.2; 340/5.7
(58) Field of Classification Search .................... 340/825
See application file for complete search history.

(56) References Cited

U.S. PATENT DOCUMENTS

| 5,081,667 A | 1/1992 | Drori et al. |
| 5,602,426 A | 2/1997 | Ecker |
| 5,612,578 A | 3/1997 | Drew |
| 5,745,035 A * | 4/1998 | Deyo ........................... 340/541 |
| 5,828,316 A | 10/1998 | DiCroce |
| 5,838,255 A | 11/1998 | Di Croce |
| 6,031,301 A * | 2/2000 | Callahan et al. .............. 307/119 |
| 6,259,169 B1 | 7/2001 | Cadieux et al. |
| 6,346,876 B1 | 2/2002 | Flick |
| 7,205,679 B2 | 4/2007 | Flick |
| 2004/0135435 A1 | 7/2004 | Nelson |
| 2005/0179323 A1 | 8/2005 | Flick |
| 2006/0080007 A1 | 4/2006 | Gerard et al. |

(Continued)

FOREIGN PATENT DOCUMENTS

CA    2 434 846 A1    9/2003

Primary Examiner — Benjamin C Lee
Assistant Examiner — Cal Eustaquio
(74) Attorney, Agent, or Firm — Merchant & Gould P.C.

(57) ABSTRACT

An aftermarket keyless starter for a vehicle including a smart ignition system and an OEM security system is provided. The OEM security system includes an OEM transponder for user verification and an OEM reader for reading the OEM transponder when the OEM transponder is within a range R of the OEM reader. The OEM transponder stores an OEM identification code. The aftermarket keyless starter includes a secure box which is outside of the range R for isolating the OEM transponder from the OEM security system, an aftermarket reader, an aftermarket microcontroller, and an aftermarket transmitter. The aftermarket microcontroller is operable to receive the keyless start command and respond thereto by having the aftermarket reader read the OEM identification code and retransmitting the OEM identification code to the OEM reader. The engine start command is transmitted to the smart ignition system subsequent to the sending of the keyless start command.

28 Claims, 2 Drawing Sheets

U.S. PATENT DOCUMENTS

2006/0138863 A1    6/2006  Jones et al.
2006/0197380 A1*   9/2006  DiCroce .................... 307/9.1
2007/0016342 A1    1/2007  Allen et al.
2007/0049069 A1    3/2007  Perhats, Sr.
2007/0076645 A1*   4/2007  VanDrunen ................ 370/315

* cited by examiner

AFTERMARKET KEYLESS STARTER

FIELD OF THE INVENTION

The present invention relates to an aftermarket keyless starter for a vehicle. More particularly, the present invention relates to an aftermarket remote starter or push-to-start starter for a vehicle comprising a transponder-based OEM security system.

BACKGROUND OF THE INVENTION

As technology evolves, and consumers' demand for that technology grows, vehicles are becoming increasingly complex, making it more and more difficult for aftermarket accessory providers to design and install aftermarket keyless starting devices such as remote and push-to-start starters. Original equipment manufacturer (OEM) security systems, i.e. security systems that are installed in a vehicle by the vehicle manufacturer, can now include transponders mounted in keys, key fobs, cards, or other devices which communicate with an OEM security system in order to deter and prevent theft. These transponders are wireless data-carrying devices that automatically respond to an incoming radio frequency (RF) signal generated by the OEM security system by returning an identification code in order to authenticate the user's identity. The transponder is able to respond to the RF signal if it is within a range R of the reader. The specific range R of a given transponder and reader varies according to a number of factors, however OEM security systems typically utilise either short-range transponders with ranges of 10 centimeters or less, or long-range transponders which typically work at a range of several meters. These transponders serve to provide identification verification of a user to the OEM security system, which itself will keep the vehicle ignition in a disabled state until such verification has occurred.

In use, a short-range transponder must be positioned at a precise location by the user, usually adjacent the ignition, in order to be recognized by the OEM security system. For example, a short-range OEM transponder embedded in the vehicle key can be read by an appropriate reader located in the steering column once it has been inserted into the ignition slot. Without this recognition, the OEM security system will not allow the car to start. Long-range transponders however provide a similar functionality but may be kept on a user, for example in their pocket or wallet, since they are detectable by the OEM security system even from outside the vehicle.

Adding to the complexity, internal vehicle system signalling has progressed from simple voltage signalling to internal databus communication, making it harder for consumers to add custom features to their vehicles.

Aftermarket starter devices and the like are well known in the art. Indeed, a conventional after-market starter normally consists of a radio frequency (RF) remote transmitter carried by a user and an associated receiver mounted in a vehicle. Upon receipt of a remote start command from the RF transmitter, an engine start command is sent to the ignition system to start the vehicle.

Further known in the art are "smart" are ignition systems. Conventional vehicles are started by turning a key in an ignition switch, which engages an ignition system. Upon hearing the engine catch, the driver releases the key and the ignition system is disengaged.

A failure on the part of the driver to release the key, and disengage the ignition system once the engine has been started may damage the engine. A smart ignition system typically comprises a built-in monitoring unit which monitors engine characteristics, such as rpm, and detects when it has been started such that the ignition system may be immediately disengaged.

Because aftermarket remote starters allow the driver to start the engine remotely, for example, from inside a dwelling, the driver is often not able to directly monitor the starting of the engine. As such, conventional aftermarket remote starters typically comprise complex aftermarket engine monitoring systems which mimic the functionality of a smart ignition, disengaging the ignition system once the engine has been started in order to avoid damaging the engine. A major drawback associated with such conventional aftermarket remote starters is that the necessary engine monitoring systems are complex and expensive to install.

Further known in the art are OEM keyless entry and push-to-start systems which use long-range transponders. Examples of such systems include the Toyota Smart Key™ system, the Cadillac Keyless Access™ system, and the Mercedes-Benz Keyless-Go™ system. Such OEM systems provide a device such as a key, key fob or card, comprising a long-range transponder to be kept on a user, for example in their pocket or wallet, which is detectable by the security system from several meters. By approaching the vehicle while in possession of the transponder, the OEM security system can automatically unlock the vehicle's doors—hence "keyless" entry—and disable the security system. By authenticating the user in this manner, the user can avoid having to introduce a vehicle key into the ignition but rather can start the vehicle by pressing a push-button mounted on the dashboard, steering wheel or gearshift, for example—hence the "push-to-start" ignition. As an added measure of security, the keyless entry and push-to-start systems may be used in conjunction with other keyless technologies, such as key codes or biometric verification.

Known in the art are the following U.S. patents which disclose prior art relating to security systems and the like.

U.S. Pat. No. 5,612,578, issued Mar. 18, 1997 to Drew, describes an aftermarket remote starter for installation in a vehicle having an OEM security system. The OEM security system comprises an ignition key having a pre-selected electrical resistance and a resistance sensing start-enable unit, such as General Motor's Vehicle Anti-Theft System (VATS).

U.S. Pat. No. 5,838,255, issued Nov. 17, 1998 to Di Croce, describes an enhanced vehicle remote control system for expanding the features of an OEM remote system.

U.S. Pat. No. 6,259,169, issued Jul. 10, 2001 to Cadieux et al., teaches an aftermarket bypass module for a transponder-based OEM security system.

U.S. Pat. No. 7,205,679, issued Apr. 17, 2007 to Flick, teaches an OEM remote starter for a vehicle having data communications bus and a transponder based security system. Mention is made of implementing the remote start controller disclosed in an aftermarket capacity, however no reference is made to the need to isolate the OEM transponder or any other aspect of adapting the remote starter to an OEM transponder-based security system.

Hence, in light of the aforementioned, there is a need for an improved aftermarket keyless starter, which by virtue of its design and components, would be able to overcome some of the above-discussed prior art problems. Moreover, there remains a need for an aftermarket keyless starter which is simple and easy to install in conjunction with modern OEM security systems.

Also known in the art are the following patents and published applications which also describe security systems and the like: U.S. Pat. No. 5,081,667, U.S. Pat. No. 5,602,426, U.S. Pat. No. 5,612,578, U.S. Pat. No. 5,828,316, U.S. Pat.

No. 5,838,255, U.S. Pat. No. 6,259,169, U.S. Pat. No. 6,346,876, U.S. Pat. No. 7,205,679, US 2004/0135435, US 2005/0179323, US 2006/0080007, US 2006/0138863, US 2007/0016342, US 2007/0049069, and CA 2,434,846.

SUMMARY OF THE INVENTION

An aspect of the present invention is to provide an aftermarket keyless starter for a vehicle which, by virtue of its design and components, satisfies some of the above-mentioned needs and is thus an improvement over other related devices known in the prior art.

Another aspect of the present invention is to provide an aftermarket remote starter which is simple and inexpensive to install. Another aspect of the present invention is to provide an aftermarket push-to-start system that is simple and inexpensive to install.

It is yet another aspect of the present invention to take advantage of OEM security system by combining features of the OEM system with aftermarket equipment to provide additional aftermarket features, such as remote starters and push-to-start starters.

It is another aspect of the present invention to provide an aftermarket remote starter system for a vehicle including an OEM transponder-based security system. It is yet another aspect of the present invention to provide an aftermarket push-to-start system for a vehicle including an OEM transponder-based security system.

In accordance with the present invention, the above aspect is achieved, as will be easily understood, with an aftermarket keyless starter such as the one briefly described herein and such as the one exemplified in the accompanying drawings.

Indeed, according to one aspect of the present invention, there is provided an aftermarket keyless starter for a vehicle including a smart ignition system and an OEM security system. The smart ignition system is responsive to an engine start command. The OEM security system includes an OEM transponder for user verification and an OEM reader for reading the OEM transponder when the OEM transponder is within a range R of the OEM reader. The OEM transponder stores an OEM identification code which the OEM security system requires receipt of in order to enable starting of the vehicle. The aftermarket keyless starter includes a box for isolating the OEM transponder from the OEM security system. The box is affixed to the vehicle such that the OEM transponder is outside of the range R when affixed within the box, an aftermarket reader, an aftermarket microcontroller for controlling communication between the OEM transponder and the OEM reader, and an aftermarket transmitter for sending a keyless start command to the aftermarket microcontroller. The aftermarket reader is operatively connectable to the OEM transponder and operable to read the OEM identification code when the OEM transponder is affixed within the box. The aftermarket microcontroller is operatively connected to the aftermarket reader and the OEM reader. The aftermarket microcontroller is operable to receive the keyless start command and respond thereto by having the aftermarket reader read the OEM identification code and retransmitting the OEM identification code to the OEM reader. The engine start command is transmitted to the smart ignition system subsequent to the sending of the keyless start command.

According to a second aspect of the present invention, there is provided an aftermarket keyless starter for a similar vehicle includes a box affixed to the vehicle for isolating the OEM transponder from the OEM security system, an aftermarket microcontroller operatively connected to the box for controlling the blocking of communication between the OEM transponder and the OEM reader by the box, and an aftermarket transmitter for sending a keyless start command to the aftermarket microcontroller. The box is operable to block communication between the OEM transponder and the OEM reader when the OEM transponder is placed therein. The aftermarket microcontroller is operable to receive the keyless start command and respond thereto by disabling the blocking of communication by the box thereby permitting communication between the OEM transponder and the OEM reader. The engine start command is transmitted to the smart ignition system subsequent to the sending of the keyless start command.

Preferably, the aftermarket transmitter is a portable transmitter operable to remotely send the keyless start command, and the aftermarket microcontroller is operable to send the engine start command to the smart ignition system in response to reception of the keyless start command. Alternatively, the aftermarket transmitter is preferable a push-to-start module comprising a push button, the push-to-start module is mounted within the vehicle, and is operatively connected to the smart ignition system. The push-to-start module is operable to send the engine start command to the smart ignition system subsequent to sending the keyless start command to the aftermarket microcontroller In accordance with a third aspect of the present invention, there is provided an aftermarket keyless starter for a vehicle comprising an ignition system and an OEM push-to-start system. The OEM push-to-start system is operatively connected to the ignition system and operable to send a push-to-start command thereto for starting the vehicle. The OEM push-to-start system includes a push-button mounted within the vehicle, an OEM transponder for user verification and an OEM reader for reading the OEM transponder when the OEM transponder is within a range R of the OEM reader. The OEM transponder stores an OEM identification code. The OEM push-to-start system requires receipt of the OEM identification code by the OEM reader in order to enable starting of the vehicle. The aftermarket keyless starter includes a box for isolating the OEM transponder from the OEM push-to-start system, an aftermarket reader which is operatively connectable to the OEM transponder and operable to read the OEM identification code when the OEM transponder is affixed within the box, a programmable aftermarket microcontroller for controlling communication between the OEM transponder and the OEM reader, and an aftermarket transmitter for sending a keyless start command to the aftermarket microcontroller. The box is affixed to the vehicle such that the OEM transponder is outside of the range R when affixed within the box. The aftermarket microcontroller is operatively connected to the aftermarket reader, the OEM reader and the vehicle ignition. The aftermarket microcontroller is operatively connected to the vehicle ignition and operable to initiate the sending of the push-button command thereto. The aftermarket microcontroller is operable to receive the keyless start command and respond thereto by having the aftermarket reader read the OEM identification code, retransmitting the OEM identification code to the OEM reader and initiating the sending of the push-button command to the vehicle ignition.

In accordance with a fourth aspect of the present invention, there is provided an aftermarket keyless starter for a vehicle comprising an ignition system and an OEM push-to-start system. The OEM push-to-start system is operatively connected to the ignition system and operable to send a push-to-start command thereto for starting the vehicle. The OEM push-to-start system includes a push-button mounted within the vehicle, an OEM transponder for user verification and an OEM reader for reading the OEM transponder. The OEM transponder stores an OEM identification code. The OEM push-to-start system requires receipt of the OEM identification code by the OEM reader in order to enable starting of the vehicle. The aftermarket keyless starter includes a box affixed to the vehicle for isolating the OEM transponder from the OEM push-to-start system, a programmable aftermarket microcontroller operatively connected to the box for controlling the blocking of communication between the OEM transponder and the OEM reader by the box, and an aftermarket transmitter for sending a keyless start command to the aftermarket microcontroller. The box is operable to block communication between the OEM transponder and the OEM reader when the OEM transponder is placed therein. The aftermarket microcontroller is further operatively connected to the vehicle ignition and operable to initiate the sending of the push-button command thereto. The aftermarket microcontroller is operable to receive the keyless start command and respond thereto by disabling the blocking of communication by the box thereby permitting communication between the OEM transponder and the OEM reader, and initiating the sending of the push-button command to the vehicle ignition.

The invention and its advantages will be better understood by reading the following non-restrictive description of a preferred embodiment thereof, made with reference to the accompanying drawings.

BRIEF DESCRIPTION OF THE DRAWINGS

The invention will be better understood upon reading the following non-restrictive description of the preferred embodiment thereof, made with reference to the accompanying drawings in which.

DETAILED DESCRIPTION OF PREFERRED EMBODIMENTS OF THE INVENTION

In the following description, the same numerical references refer to similar elements. The embodiments shown in the figures are preferred, for exemplification purposes only.

Moreover, in the context of the present description, the expressions "system", "device", "assembly", "apparatus" and "unit", as well as any other equivalent expressions and/or compound words thereof, may be used interchangeably, as apparent to a person skilled in the art.

In addition, although the preferred embodiments of the present invention as illustrated in the accompanying drawings comprise various components, etc., and although the preferred embodiments of the aftermarket keyless starter and corresponding parts of the present invention as shown consist of certain specific configurations as explained and illustrated herein, not all of these components and geometries are essential to the invention and thus should not be taken in their restrictive sense, i.e. should not be taken as to limit the scope of the present invention. It is to be understood, as also apparent to a person skilled in the art, that other suitable components and cooperations therebetween, as well as other suitable specific configurations may be used for the aftermarket keyless starter according to the present invention, as will be briefly explained herein and as can be easily inferred herefrom by a person skilled in the art, without departing from the scope of the invention.

Figure 1:
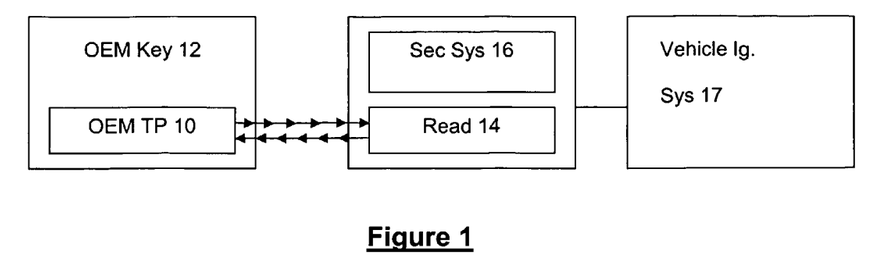
FIG. 1 is a schematic representation of an OEM security system.

With reference to FIG. 1, a vehicle is provided with an OEM "smart" ignition system 17 and a transponder-based OEM security system 16.

The OEM security system 16 comprises an OEM transponder 10 which is used to verify the identity of a user and is embedded on an OEM device 12, such as a key, a key fob, or card. The OEM transponder 10 is a contactless data carrier powered by and responsive to, a RF field generated by an OEM reader 14 in the vehicle. The OEM transponder 10 stores an OEM identification code which identifies the user and which must be received by the OEM security system 16 in order to enable use the vehicle. When powered by the RF field of the OEM reader 14, the OEM transponder 10 responds by transmitting the OEM identification code. Unless the OEM transponder 10 is detected by the OEM reader 14 in this manner, the OEM security system 16 will keep the smart ignition system 17 in a disabled state and prevent starting of the engine. Upon communication with the OEM transponder 10 and verification of the OEM code provided, the OEM security system 16 sends an engine start enable command to the smart ignition system 17 to enable a driver to start the vehicle. The smart ignition system 17 will receive an engine start command when the driver turns the OEM key 12 in the ignition, but will not start the engine without having first received the engine start enable command.

Figure 2:
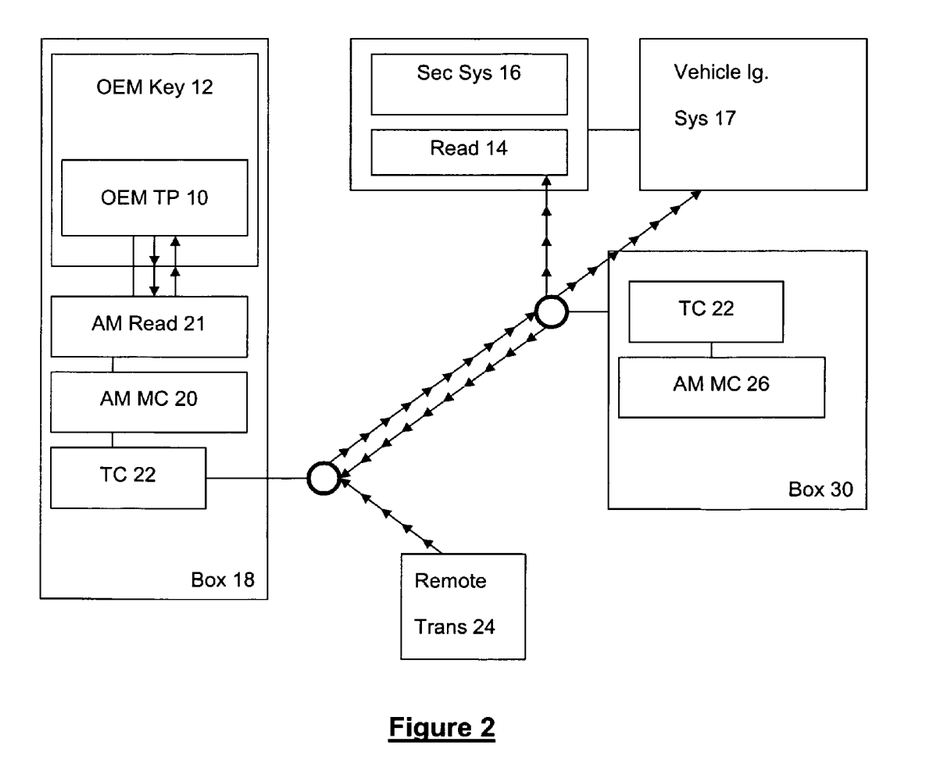
FIG. 2 is a schematic representation of a keyless aftermarket starter system in accordance with first and second embodiments of the present invention.

As illustrated in FIG. 2, an aftermarket keyless starter 11 is installed to operate in conjunction with the OEM transponder-based security system 16 illustrated in FIG. 1. The aftermarket keyless starter 11 comprises a secure box 18, an aftermarket microcontroller 20 and an aftermarket transmitter 24. The secure box 18 is affixed to the vehicle and isolates the OEM transponder 10 from the OEM security system 16 when the OEM key 12 is placed therein. The aftermarket microcontroller 20 is operatively connected to the secure box and operable to control communication between the secured OEM transponder 10 and the OEM reader 14. The aftermarket transmitter 24 is operable to send a keyless start command to the aftermarket microcontroller 20.

In a first embodiment, the OEM transponder 10 is a short-range transponder. As such, the secure box 18 need only secure the OEM transponder 10 at a location on the vehicle which is outside the range of the OEM reader 14 in order to block communication between the OEM transponder 10 and the OEM reader 14. An aftermarket reader 21 is operatively connected to the aftermarket microcontroller 20 such that it can communicate with the OEM transponder 10. When instructed by the aftermarket microcontroller 20, the aftermarket reader 21 is operable to read the OEM transponder 10 and the OEM identification code stored thereon. The aftermarket microcontroller 20 is programmable such that it can operate in conjunction with different vehicles and their OEM systems. For example, vehicle-specific data may be uploaded to the aftermarket microcontroller 20 during installation.

Preferably, the aftermarket reader 12 operates similarly to the OEM reader 14 and communicates with the OEM transponder 10 wirelessly, although it will apparent to one of skill in the art that other ways of operatively connecting the aftermarket reader 12 and the OEM transponder 10 are equally feasible. One such alternative is to hard-wire the aftermarket reader 21 and the OEM transponder 10 within the secure box 18.

Preferably, the secure box 18 is hidden on the vehicle from sight by a third party and lockable such that, even if found, a third party would be unable to open it and access its contents. The secure box 18 can further be provided with its own power source which is independent from the vehicle's power source in order to further isolate the secure box 18 and make it difficult for a potential thief to find.

Further provided is a first transceiver 22 which is operatively connected to the aftermarket microcontroller 20 and able to receive and transmit messages to and from the aftermarket microcontroller 20. In a preferred embodiment, the first transceiver 22 is operable to receive wireless signals.

Preferably, the aftermarket microcontroller 20 is a first aftermarket microcontroller 20 and the aftermarket keyless starter 11 further includes a second aftermarket microcontroller 26. The second aftermarket microcontroller 26 is provided within a control box 30 along with a second transceiver 28. The second aftermarket microcontroller 26 is provided for interfacing between the first aftermarket microcontroller 20, and the OEM security system 16 and OEM ignition system 17.

In operation, the first aftermarket microcontroller 20 receives the keyless start command through the first transceiver 22 from the aftermarket transmitter 24. The first microcontroller 20 then has the aftermarket reader 21 read the OEM identification code stored on the OEM transponder 10 and transmits that code to the second aftermarket microcontroller 26 via the second transceiver 28. The second aftermarket microcontroller 26 then communicates the OEM identification code to the OEM reader 14, thereby enabling the smart ignition system 17.

At this point, the second aftermarket microcontroller 26 can send an engine start command to the vehicle ignition system 17 emulating the engine start command that would have been initiated when a driver turns the OEM key 12 in order to start the engine.

Because the vehicle comprises a smart ignition system 17, the aftermarket keyless starter does not require an additional engine-monitoring unit. Moreover, by isolating the OEM transponder 10 and putting it in communication with the first aftermarket microcontroller 20, communication between the box 18 securing the OEM key 12 and the second microcontroller 26 can be done wirelessly.

In a preferred embodiment of the present invention, the aftermarket transmitter 24 is a portable transmitter operable to remotely transmit the keyless start command to the first aftermarket microcontroller 20 in response to a user engagement, for example, of a button thereon. Preferably, the remote transmitter 24 is a wireless keychain transmitter.

With continued reference to FIG. 2, a second embodiment of the present invention provides an aftermarket keyless starter for a vehicle with an OEM hands-free keyless entry. In accordance with this embodiment, the OEM transponder 10 is a long-range transponder which is operable to communicate with the OEM reader 14 within a range of several meters, practically speaking from inside and outside the vehicle. An OEM device 12 secured in the secure box 18 will therefore always be within the range of the OEM reader 14 regardless of its position on the vehicle. As such, in the second embodiment, the secure box 18 is operable to isolate the OEM transponder 10 by blocking communication between the OEM 14 reader and the OEM transponder 10 when the transponder 10 is placed therein. The aftermarket microcontroller 20 is operable to control this blocking and temporarily allow communication between the OEM transponder 10 and the OEM reader 14.

Under control of the first aftermarket microcontroller 20, the secure box 18 is operable to unshield the OEM device 12, thereby making it "visible" to the OEM reader 14, and selectively allow communication between the OEM transponder 10 and the OEM reader 14 at predetermined moments and for predetermined durations. As such, the aftermarket reader 21 is not needed in this embodiment as the secured OEM transponder 10 is operable to transmit the OEM identification code to the OEM reader 10 on its own.

As in the previous embodiment, the aftermarket microcontroller 20 is preferably a first microcontroller 20, and a second microcontroller 26 and a second transceiver 28 are further provided in a control box 30 for interfacing with the OEM security system 16 and the smart ignition system 17.

In operation, the first microcontroller 20 receives the engine start command from the remote transmitter 24 via the first transceiver 22. The first microcontroller 20 then unblocks the OEM transponder 10 in the secure box 18, rendering the OEM transponder 10 visible to the OEM reader 14 and unblocking communication therebetween. The first microcontroller 20 sends a signal, preferably wirelessly, to the second microcontroller 26 via the first and second transceivers 22 and 28 indicating that the OEM transponder 10 is visible, and the second microcontroller 28 sends an engine start command to the vehicle ignition system in order to start the engine. Because the OEM transponder 10 is visible to the OEM security system 16, the engine can be started.

If the engine start command proves too difficult to emulate because, for example, of a code-hopping arrangement, a servo operated mechanism may be installed to physically engage an OEM push-to-start button, if such an OEM starter is provided.

The secure box 18 may block communication to and from the long-range OEM transponder 10 in numerous ways. In a first preferred embodiment, the secure box 18 is RF-shielded and therefore operable to shield the OEM transponder 10 from the RF field generated by the OEM reader 14 and hence block communication therebetween. This can be accomplished by constructing the secure box 18 from a conducting material such as a metal, preferably continuous, as is known in the art and will not be discussed further herein. The unshielding of the box 18 may consist of physically opening a portion of the secure box 18 and allowing RF signals to reach the OEM transponder 10, although other methods of selectively unshielding the OEM device 12 from RF signals are within the scope of the present invention.

In another preferred embodiment wherein the OEM transponder 10 is an active transponder comprising an internal power source such as a battery, communication between the OEM reader 14 and the OEM transponder 10 can be blocked by removing that battery and supplying power through the aftermarket microcontroller 20. Visibility of the OEM transponder 10 can be restored intermittently by the aftermarket microcontroller 20 by supplying power when desired. In this case, the OEM transponder would not need to be RF-shielded, but merely physically isolated, as described in connection to the first embodiment of the present invention. Such an alternate embodiment also allows the control the OEM transponder 10 to be accomplished without additional moving parts.

Alternative methods of blocking and unblocking RF communication to and from the OEM transponder 10, such as jamming RF communication by emitting an interfering signal, are also within the scope of the present invention and will not be discussed further herein.

In the previous embodiments, it may be desirable for security reasons, amongst others, for the OEM transponder 10 to remain visible only for the amount of time required to enable the engine to start. In other cases, however, the OEM security system 16 may require a periodic monitoring of the OEM transponder 10 to ensure its continued presence. In such cases, the microcontroller 20 is programmed to unshield the OEM transponder 10 periodically in accordance with different OEM security systems 16 which may have different requirements in terms of maintaining visibility of the transponder 10. As such, the first and second microcontrollers 20 and 26 are programmable to make visible the OEM transponder 10 for predetermined lengths of time and at predetermined intervals after the engine has been started in accordance with the specific vehicle into which the aftermarket keyless starter is installed. These functions may be programmed in a variety of ways, including, but in no way limited to, dipswitches; by downloading vehicle parameters through a USB or RS232 port hook up during, or prior to, installation; or through a self-learning mode whereby the system 11 is operable to determine what a given vehicle requires, and adjust itself accordingly.

Figure 3:
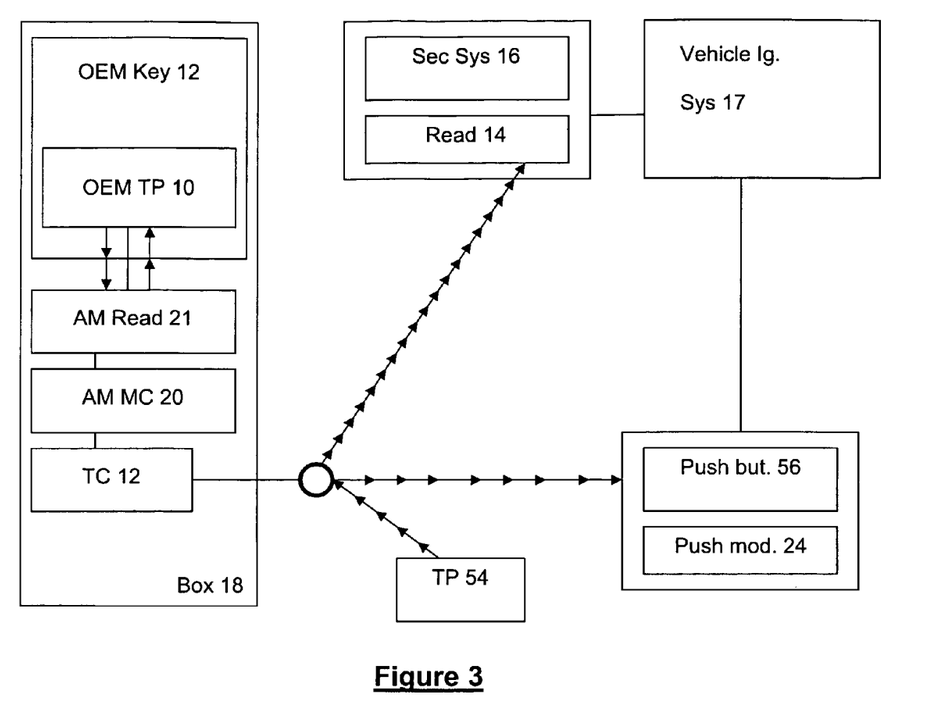
FIG. 3 is a schematic representation of a keyless aftermarket starter in accordance with a third embodiment of the present invention.

A third embodiment of the present invention is illustrated in FIG. 3. In this preferred embodiment, the aftermarket transmitter 24 is a push-to-start module, comprising a push button 56, which is mounted inside the vehicle within reach of the driver. This embodiment may be used in conjunction with a short-range or long-range OEM transponder-based security system 16 by adapting to the transponder's type using the same principles as those described above. This embodiment may further be used with a control box 30 comprising a second aftermarket microcontroller 26, although this option is not illustrated in FIG. 3.

As in the previous embodiments, the OEM key 12 comprising the OEM transponder 10 is isolated from an OEM reader 14 in the secure box 18. The aftermarket microcontroller 20 communicates with the OEM transponder 10 through an aftermarket reader 51 in the case of a short-range OEM transponder 10, or alternatively controls the communication blocking of the secure box 18 in the case of an OEM long-range transponder 10. The transceiver 22 is operable to receive and transmit messages to and from the microcontroller 10.

An aftermarket identification device 54 is additionally provided for verification and authentication of the user to the aftermarket keyless starter 11. This ID device 54 is preferably a long-range transponder and is used to authenticate the identity of the user in a similar manner, but completely independently, to the OEM transponder 10 and OEM security system 16. The transceiver 22 is further operable to detect and/or read the ID device 54 in the pocket or wallet of a user and transfer that information to the microcontroller 20. In a similar manner to the OEM security system 16, the aftermarket starter 11 will not allow keyless start by the push-to-start module 24 without detection by the aftermarket microcontroller 20 of the identification device 54.

In use, upon detection of the aftermarket transponder 54 by the transceiver 22, the microcontroller 20 either has aftermarket reader 51 read the OEM identification code off the OEM transponder 40 and transmits the OEM code to the OEM reader 44, or alternatively unblocks communication between the two, as required. In either case, the aftermarket microcontroller 20 is operable to disable the OEM security system 46. Having received and verified the OEM identification code, the OEM security system 46 sends an engine start enable command to the vehicle "smart" ignition system 47.

Having authenticated the user by detecting the identification device 54, the microcontroller 50 can send a push-to-start enable command to the push-to-start module 58. With the push-to-start module 58 enabled, the driver can push the push button 56 and send an engine start command to the vehicle ignition system 47, thereby starting the vehicle.

The aftermarket keyless starter 11 preferably further comprises a sensor 36 which is operatively connected to the aftermarket microcontroller 20 enabling it to monitor any motion or activity associated with the vehicle, such as an unlocking of the doors, an opening or closing of a vehicle door, or the putting of the vehicle in gear. Once the engine has been started, the microcontroller 20 is operable to verify the presence of the ID device 54 upon detection of any subsequent vehicle activity. Should the microcontroller 50 not detect the ID device 54, it will send an engine stop command to the smart ignition system 17 to shut down the engine in order to prevent an unauthorised user (i.e. one not in possession of the ID device 54) from operating the vehicle.

Instead of a long-range transponder which is detectable by the aftermarket microcontroller 20, the aftermarket device 54 may be a remote transmitter, similar to the previously described remote transmitter 24. The user would then manually activate the remote transmitter 54 to send a signal to the microcontroller 20 and enable the push-to-start module 58. While less convenient, such manual activation may be accomplished discretely, for example, from inside a user's pocket.

In another embodiment of the present invention, the aftermarket keyless starter 11 is used in conjunction with a vehicle comprising an OEM push-to-start system. The OEM push-to-start system comprises a push-button mounted within the vehicle and within reach of the driver. In response to actuation of the push-button, the OEM push-to-start system sends a push-to-start command to the ignition system in order to start the car. This push-to-start command can be in the form of a ground signal, a databus signal, or other signal as is known in the art. Additionally provided is an OEM transponder which may be short-range or long-range and is used to authenticate the user as described above. This OEM transponder is isolated in the secure 18 and communication between it and the OEM push-to-start system is controlled by the secure box 18 and the aftermarket microcontroller 20 as described above. In this embodiment, the aftermarket transmitter 24 is a portable transmitter which is operable to remotely transmit the keyless start command to the aftermarket microcontroller.

In addition to retransmitting the OEM identification code, or making the OEM transponder 10 visible, as required, the aftermarket microcontroller is further operable to initiate the sending of the push-to-start command to the ignition system. This initiation may be the sending of the push-to-start command to the ignition system by the aftermarket keyless starter 11, or the causing of the push-to-start system itself to send that command to be sent to the ignition system. In the case of the latter, an actuator can be mounted adjacent the push-button such that it can push the push-button, thereby simulating direct engagement by a user and sending the push-to-start command to the vehicle ignition.

As will be apparent, other means of activating the push-to-start system such that it, and not the aftermarket keyless starter 11, are possible and within the scope of the present invention.

In operation, a user activates the portable aftermarket transmitter 24 which transmits a keyless start command to the aftermarket microcontroller 20. The aftermarket microcontroller 20 responds by either reading the OEM identification code on the OEM transponder 20 and retransmitting it to the OEM push-to-start system or unblocks communication between the OEM transponder 10 and the OEM reader 14 and initiates the sending of the push-button command to the vehicle ignition.

As will be apparent to one of ordinary skill in the art, all wireless communication described herein may be encrypted.

Furthermore, communication between the various elements in system 11 may be accomplished wirelessly or by hard-wiring, as desired.

Of course, numerous modifications could be made to the above-described embodiments without departing from the scope of the invention, as apparent to a person skilled in the art.

While specific embodiments of the present invention have been described and illustrated, it will be apparent to those skilled in the art that numerous modifications and variations can be made without departing from the scope of the invention as defined in the appended claims.

The invention claimed is:

1. An aftermarket keyless starter for a vehicle comprising a smart ignition system and an original equipment manufacturer (OEM) security system, the smart ignition system being responsive to an engine start command, the OEM security system cooperating with an OEM transponder for user verification, the OEM security system comprising an OEM reader for reading the OEM transponder when the OEM transponder is within a range R of the OEM reader, the OEM transponder storing an OEM identification code, the OEM security system requiring receipt of the OEM identification code by the OEM reader in order to enable starting of the vehicle, the aftermarket keyless starter comprising:
   a) a secure box for isolating the OEM transponder from the OEM security system, the secure box being affixed to the vehicle such that the OEM transponder is outside of the effective signal range when secured within the secure box;
   b) an aftermarket reader which is operatively connectable to the OEM transponder and operable to read the OEM identification code when the OEM transponder is secured within the secure box;
   c) a programmable aftermarket microcontroller for controlling communication between the OEM transponder, through the aftermarket reader, and the OEM reader, the aftermarket microcontroller operatively connected to the aftermarket reader and the OEM reader; and
   d) an aftermarket transmitter for sending a keyless start command to the aftermarket microcontroller for extending the range of the OEM system; wherein the aftermarket microcontroller is operable to receive the keyless start command and respond thereto by having the aftermarket reader read the OEM identification code and retransmitting the OEM identification code to the OEM reader, and wherein the engine start command is transmitted to the smart ignition system subsequent to the sending of the keyless start command.

2. The aftermarket keyless starter of claim 1, wherein the aftermarket transmitter is a portable transmitter operable to remotely send the keyless start command, and the aftermarket microcontroller is operable to send the engine start command to the smart ignition system in response to reception of the keyless start command.

3. The aftermarket keyless starter of claim 2, wherein the portable transmitter comprises a wireless transmitter for wirelessly transmitting the keyless start command to the aftermarket microcontroller.

4. The aftermarket keyless starter of claim 1, wherein the first aftermarket microcontroller is a first microcontroller, the aftermarket keyless starter further comprising a second microcontroller operatively connected to the first microcontroller, the OEM reader and the smart ignition system, the second microcontroller operable to receive the OEM identification code from the first microcontroller and transmit the OEM identification code to the OEM reader, the second microcontroller further operable to transmit the engine start command to the smart ignition system.

5. The aftermarket keyless starter of claim 1, wherein the aftermarket transmitter is a push-to-start module comprising a push button, the push-to-start module being mounted within the vehicle and operatively connected to the smart ignition system, the push-to-start module being operable to send the engine start command to the smart ignition system subsequent to sending the keyless start command to the aftermarket microcontroller.

6. The aftermarket keyless starter of claim 5, wherein the push-to-start module comprises a wireless transmitter which is operable to wirelessly transmit the keyless start command to the aftermarket microcontroller.

7. The aftermarket keyless starter of claim 5, further comprising an aftermarket identification device for user verification.

8. The aftermarket keyless starter of claim 7, wherein the identification device is an aftermarket long-range transponder storing an aftermarket identification code.

9. The aftermarket keyless starter of claim 7, further comprising a sensor, the sensor being operatively connected to the aftermarket microcontroller, the aftermarket microcontroller being operable to verify the presence of the aftermarket identification device when the sensor detects exterior activity, and the aftermarket microcontroller being operable to send an engine stop command to the smart ignition system if the presence of the aftermarket identification device is not verified.

10. An aftermarket keyless starter for a vehicle comprising a smart ignition system and an original equipment manufacturer (OEM) security system, the smart ignition system being responsive to an engine start command, the OEM security system cooperating with an OEM transponder for user verification, the OEM security system comprising an OEM reader for reading the OEM transponder, the OEM transponder storing an OEM identification code, the OEM security system requiring receipt of the OEM identification code by the OEM reader in order to enable starting of the vehicle, the aftermarket keyless starter comprising:
   a) a secure box affixed to the vehicle for isolating the OEM transponder from the OEM security system, the secure box operable to block communication between the OEM transponder and the OEM reader when the OEM transponder is placed therein;
   b) a programmable aftermarket microcontroller operatively connected to the secure box for controlling the blocking of communication between the OEM transponder and the OEM reader by the secure box; and
   c) an aftermarket transmitter for sending a keyless start command to the aftermarket microcontroller for extending the range of the OEM system; wherein the aftermarket microcontroller is operable to receive the keyless start command and respond thereto by disabling the blocking of communication by the secure box thereby permitting communication between the OEM transponder and the OEM reader, and wherein the engine start command is transmitted to the smart ignition system subsequent to the sending of the keyless start command.

11. The aftermarket keyless starter of claim 10, wherein the box is operable to block radio frequency communication and the aftermarket microcontroller is operable to instruct the box to unblock radio frequency communication in order to permit communication between the OEM transponder and the OEM reader.

12. An aftermarket keyless starter for a vehicle comprising a smart ignition system and an original equipment manufacturer (OEM) security system, the smart ignition system being responsive to an engine start command, the OEM security system cooperating with an OEM transponder for user verification, the OEM security system comprising an OEM reader for reading the OEM transponder, the OEM transponder storing an OEM identification code, the OEM security system requiring receipt of the OEM identification code by the OEM reader in order to enable starting of the vehicle, the aftermarket keyless starter comprising:
  a) a box affixed to the vehicle for isolating the OEM transponder from the OEM security system, the box operable to block communication between the OEM transponder and the OEM reader when the OEM transponder is placed therein;
  b) a programmable aftermarket microcontroller operatively connected to the box for controlling the blocking of communication between the OEM transponder and the OEM reader by the box; and
  c) an aftermarket transmitter for sending a keyless start command to the aftermarket microcontroller and for extending the range of the OEM security system;
  wherein the aftermarket microcontroller is operable to receive the key less start command and respond to the keyless start command by disabling the blocking of communication by the box thereby permitting communication between the OEM transponder and the OEM reader, and wherein the engine start command is transmitted to the smart ignition system subsequent to the sending of the keyless start command,
  wherein the box is operable to block radio frequency communication and the aftermarket microcontroller is operable to instruct the box to unblock radio frequency communication in order to permit communication between the OEM transponder and the OEM reader, and wherein the box is a metal box and the aftermarket microcontroller is operable to open the metal box.

13. The aftermarket keyless starter of claim 10, wherein the box further comprises a power supply for supplying power to the OEM transponder, the box operative to remove power to the OEM transponder, to block communication between the OEM transponder and the OEM reader.

14. The aftermarket keyless starter of claim 10, wherein the box is operable to electrically block communication between the OEM transponder and OEM reader.

15. The aftermarket keyless starter of claim 10, wherein the aftermarket transmitter is a portable transmitter operable to remotely send the keyless start command, and the aftermarket microcontroller is operable to send the engine start command to the smart ignition system in response to reception of the keyless start command.

16. The aftermarket keyless starter of claim 14, wherein the portable transmitter comprises a wireless transmitter for wirelessly transmitting the keyless start command to the aftermarket microcontroller.

17. The aftermarket keyless starter of claim 10, wherein the aftermarket microcontroller is a first microcontroller, the aftermarket keyless starter further comprising a second microcontroller operatively connected to the first microcontroller and the smart ignition system, the second microcontroller operable to transmit the engine start command to the smart ignition system.

18. The aftermarket keyless starter of claim 10, wherein the aftermarket transmitter is a push-to-start module comprising a push button, the push-to-start module being mounted within the vehicle and operatively connected to the smart ignition system, the push-to-start module being operable to send the engine start command to the smart ignition system subsequent to sending the keyless start command to the aftermarket microcontroller.

19. The aftermarket keyless starter of claim 18, wherein the push-to-start module comprises a wireless transmitter which is operable to wirelessly transmit the keyless start command to the aftermarket microcontroller.

20. The aftermarket keyless starter of claim 19, further comprising an aftermarket identification device for user verification.

21. An aftermarket keyless starter for a vehicle comprising an ignition system and an original equipment manufacturer (OEM) push-to-start system, the OEM push-to-start system operatively connected to the ignition system and operable to send a push-to-start command thereto for starting the vehicle, the OEM push-to-start system comprising a push-button mounted within the vehicle, and an OEM reader for reading the OEM transponder when an OEM transponder for user verification is within a range of the OEM reader, the OEM transponder storing an OEM identification code, the OEM push-to-start system requiring receipt of the OEM identification code by the OEM reader in order to enable starting of the vehicle, the aftermarket keyless starter comprising:
  a) a secure box for isolating the OEM transponder from the OEM push-to-start system, the secure box being affixed to the vehicle such that the OEM transponder is outside of the effective signal range R when secured within the secure box;
  b) an aftermarket reader which is operatively connectable to the OEM transponder and operable to read the OEM identification code when the OEM transponder is secured within the secure box;
  c) a programmable aftermarket microcontroller for controlling communication between the OEM transponder, through the aftermarket reader, and the OEM reader, the aftermarket microcontroller operatively connected to the aftermarket reader, the OEM reader and the vehicle ignition, the aftermarket microcontroller operatively connected to the vehicle ignition and operable to initiate the sending of the push-button command thereto; and
  d) an aftermarket transmitter for sending a keyless start command to the aftermarket microcontroller; wherein the aftermarket microcontroller is operable to receive the keyless start command and respond thereto by having the aftermarket reader read the OEM identification code, retransmitting the OEM identification code to the OEM reader and initiating the sending of the push-button command to the vehicle ignition.

22. The aftermarket keyless starter of claim 21, further comprising an actuator mounted adjacent the push-button and operative to push the push-button, the actuator being operatively connected to the aftermarket microcontroller and operable to push the push-button upon receipt of instructions to that effect from the aftermarket microcontroller, thereby resulting in the sending of the push-button command to the vehicle ignition.

23. An aftermarket keyless starter for a vehicle comprising an ignition system and an original equipment manufacturer (OEM) push-to-start system, the OEM push-to-start system operatively connected to the ignition system and operable to send a push-to-start command thereto for starting the vehicle, the OEM push-to-start system comprising a push-button mounted within the vehicle, and an OEM reader for reading an OEM transponder for user verification, the OEM transponder storing an OEM identification code, the OEM push-to-start system requiring receipt of the OEM identification code by the OEM reader in order to enable starting of the vehicle, the aftermarket keyless starter comprising:

a) a secure box affixed to the vehicle for isolating the OEM transponder from the OEM push-to-start system, the secure box operable to block communication between the OEM transponder and the OEM reader when the OEM transponder is placed therein;

b) a programmable aftermarket microcontroller operatively connected to the secure box for controlling the blocking of communication between the OEM transponder and the OEM reader by the secure box, the aftermarket microcontroller further operatively connected to the vehicle ignition and operable to initiate the sending of the push-button command thereto; and c) an aftermarket transmitter for sending a keyless start command to the aftermarket microcontroller; wherein the aftermarket microcontroller is operable to receive the keyless start command and respond thereto by disabling the blocking of communication by the secure box thereby permitting communication between the OEM transponder and the OEM reader, and initiating the sending of the push-button command to the vehicle ignition.

24. The aftermarket keyless starter of claim 21, further comprising an actuator mounted adjacent the push-button and operative to push the push-button, the actuator being operatively connected to the aftermarket microcontroller and operable to push the push-button upon receipt of instructions from the aftermarket microcontroller, resulting in the sending of the push-button command to the vehicle ignition.

25. The aftermarket keyless starter of claim 1, wherein the box is a secure box.

26. The aftermarket keyless starter of claim 10, wherein the box is a secure box.

27. The aftermarket keyless starter of claim 21, wherein the box is a secure box.

28. The aftermarket keyless starter of claim 23, wherein the box is a secure box.

* * * * *